(12) United States Patent
Akechi (10) Patent No.: US 10,889,259 B2
(45) Date of Patent: Jan. 12, 2021

(54) COATED FABRIC FOR AIRBAG

(71) Applicant: Toyobo Co., Ltd., Osaka (JP)

(72) Inventor: Tsutomu Akechi, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 147 days.

(21) Appl. No.: 15/300,311

(22) PCT Filed: Dec. 22, 2014

(86) PCT No.: PCT/JP2014/083964
§ 371 (c)(1),
(2) Date: Sep. 29, 2016

(87) PCT Pub. No.: WO2015/151358
PCT Pub. Date: Oct. 8, 2015

(65) Prior Publication Data
US 2017/0136982 A1    May 18, 2017

(30) Foreign Application Priority Data

Mar. 31, 2014   (JP) ................................ 2014-071445

(51) Int. Cl.
*B60R 21/235*    (2006.01)
*D03D 1/02*      (2006.01)
*D06M 15/643*    (2006.01)
(52) U.S. Cl.
CPC ............. *B60R 21/235* (2013.01); *D03D 1/02* (2013.01); *D06M 15/643* (2013.01); *B60R 2021/23514* (2013.01); *D10B 2505/124* (2013.01)

(58) Field of Classification Search
CPC ........ B60R 2021/23514; B60R 21/235; D03D 1/02; D06M 15/643; D10B 2505/124
See application file for complete search history.

(56) References Cited

U.S. PATENT DOCUMENTS

| 6,387,451 | B1  | 5/2002 | Collins et al. | |
| 7,985,702 | B2* | 7/2011 | Kano | B60R 21/235 280/728.1 |
| 7,994,076 | B2* | 8/2011 | Kano | B60R 21/235 280/728.1 |
| 8,211,813 | B2* | 7/2012 | Morimoto | B60R 21/235 280/728.1 |

(Continued)

FOREIGN PATENT DOCUMENTS

| JP | 06-008779 | 1/1994 |
| JP | 08-225772 | 9/1996 |

(Continued)

OTHER PUBLICATIONS https://patents.google.conn/patent/JP2853936B2/en?oq=JP2853936B2 (Year: 1992).*

(Continued)

*Primary Examiner* — Arti Singh-Pandey
(74) *Attorney, Agent, or Firm* — Fish & Richardson P.C.

(57) ABSTRACT

A coated fabric for an airbag having improved tensile strength of coated fabric without increasing the strength of a raw yarn is provided. The coated fabric for the airbag comprises a coated silicone resin on one surface of a textile made of synthetic fiber filaments, wherein the silicone resin is present at a joint between warp and weft of a non-coated surface of the textile.

10 Claims, 2 Drawing Sheets

(56) References Cited

U.S. PATENT DOCUMENTS

| | | | | |
|---|---|---|---|---|
| 8,722,553 | B2* | 5/2014 | Johansson | B60R 21/235 280/728.1 |
| 8,815,757 | B2* | 8/2014 | Akechi | D03D 1/02 280/728.1 |
| 9,868,413 | B2* | 1/2018 | Ise | B60R 21/235 |
| 9,889,816 | B2* | 2/2018 | Nishimura | B60R 21/235 |
| 2001/0046823 | A1 | 11/2001 | Sogi et al. | |
| 2005/0244596 | A1 | 11/2005 | Schindzielorz et al. | |
| 2010/0260976 | A1* | 10/2010 | Kano | B60R 21/235 428/172 |
| 2012/0015573 | A1* | 1/2012 | Akechi | D03D 1/02 442/59 |
| 2013/0189887 | A1* | 7/2013 | Akechi | D03D 1/02 442/60 |
| 2015/0017859 | A1 | 1/2015 | Akechi et al. | |
| 2015/0210240 | A1* | 7/2015 | Tanaka | B60R 21/235 442/189 |
| 2015/0239419 | A1* | 8/2015 | Jin | D06C 11/00 442/169 |
| 2015/0247283 | A1* | 9/2015 | Akechi | B60R 21/235 442/60 |
| 2016/0207492 | A1* | 7/2016 | Akechi | B60R 21/235 |
| 2017/0137976 | A1* | 5/2017 | Youn | D03D 13/004 |
| 2017/0327979 | A1* | 11/2017 | Akechi | D03D 13/008 |

FOREIGN PATENT DOCUMENTS

| | | |
|---|---|---|
| JP | 2006-273110 | 10/2006 |
| JP | 2009-074215 | 4/2009 |
| JP | 2009-167551 | 7/2009 |
| JP | 2010-106375 | 5/2010 |
| WO | 2013/118755 | 8/2013 |

OTHER PUBLICATIONS

European Patent Office, Communication mailed in European Patent Application No. 14 888 155.0 (dated Mar. 13, 2018).

European Patent Office; Notice of Observations by Third Party dated Nov. 17, 2017 in corresponding European Patent Application No. 14888155.0.

English-language translation of Japanese Publication No. H06-008779.

Japan Patent Office, International Search Report for PCT/JP2014/083964 (dated Mar. 17, 2015) (with English translation).

Indian Patent Office; Examination Report mailed in counterpart Indian Application No. 201647036235 (dated Jun. 16, 2020).

* cited by examiner

COATED FABRIC FOR AIRBAG

TECHNICAL FIELD

The present invention relates to a coated fabric to be used for automobile airbag, and more particularly to a coated fabric for an airbag which has improved tensile strength without increasing the strength of raw yarn.

BACKGROUND ART

Airbags, installation rate of which are increasing rapidly as one of automobile safety parts in recent years, are used for the purpose of preventing bodies of a driver and passengers, particularly heads from impinging against a steering wheel, a windshield, a door window glass or the like and protecting an occupant s body in the event of a crash of automobile by detecting the impact with a sensor, generating a high-temperature and high-pressure gas from an inflator, and instantaneously deploying an airbag with this gas. In recent years, automotive airbags have been developed in their practical use not only for a driver seat and a passenger seat but also as knee airbags, side airbags, curtain airbags, etc., and installation of a plurality of airbags becomes common.

Requirements for further a reduction of weight and downsizing of an airbag system increases with an increase of site and number of airbag to be installed, and each part of the system is designed aimed at downsizing and a reduction of weight. From such a background, a measure using a base fabric in which yarn having small fineness is principally used for airbags, has been investigated.

For example, the fineness of filaments which are used for coated fabric for airbags is decreased from 940 dtex to 470 dtex, and in recent years, the base fabric has been changed to a base fabric using filaments having fineness of 350 dtex.

However, when the fineness of synthetic fibers constituting a textile is decreased for a reduction of weight, absolute tensile strength is deteriorated, and a problem that bursting performance as an airbag is deteriorated arises. In order to solve this, it is proposed to employ high strength fibers exceeding 7 to 9 cN/dtex which is strength of raw yarn usually widely used as raw yarn for airbags (e.g., Patent Documents 1, 2).

However, in high strength fibers exceeding 9 cN/dtex, the occurrence of so-called fuzz that a single yarn constituting a raw yarn is broken due to an increased stretching magnification, increases, and particularly in the base fabric which is coated, use of the high strength fibers do not substantially contribute to an improvement of tensile strength, and consequently bursting performance has not been improved.

PRIOR ART DOCUMENTS

Patent Documents

Patent Document 1: Japanese Unexamined Patent Application Publication No. 2009-167551
Patent Document 2: Japanese Unexamined Patent Application Publication No. 2010-106375

SUMMARY OF INVENTION

Technical Problem

It is an object of the present invention to provide an coated fabric for airbags which has improved tensile strength without using fibers having high strength of not less than 9 cN/dtex, which the prior art has not solved.

Solutions to Problems

The present inventor has found, in a base fabric for airbags in which one surface of a textile is coated with a thermoplastic resin, a novel technical thought that a resin is allowed to exist at a portion from a coated surface side to a joint between the warp and weft of the non-coated surface side when coating the textile with the resin. Thereby, a degree of freedom at which the warp and the weft move is limited to restrain the yarn, and the whole yarn is broken at a time at an ordinary tensile test of a base fabric, and therefore it is possible to achieve high tensile strength as a base fabric, and these findings led to completion of the present invention.

That is, the present invention is typically as follows.

[1] A coated base fabric for an airbag comprising a coated silicone resin on one surface of a textile made of synthetic fiber filaments, wherein the silicone resin is present at a joint between warp and weft of a non-coated surface of the textile.

[2] The coated fabric for the airbag according to [1], wherein a tensile strength of the base fabric after coating is 5% or more higher than that of a base fabric before coating.

[3] The coated fabric for the airbag according to [1] or [2], the silicone resin has viscosity before coating of 15 Pa·sec or less, a coating strength of the resin of 5 MPa or more, a coating elongation of the resin of 150% or less and hardness of 45 or more.

[4] The coated fabric according to any one of [1] to [3], wherein a coating amount of the silicone resin is 5 g/m² or more and 35 g/m² or less.

[5] The coated fabric according to any one of [1] to [4], wherein the coated base fabric is produced by an applying method wherein the applying method of the silicone resin is a knife on air method in which a knife compressing amount is 1 mm to 6 mm.

[6] The coated fabric for the airbag according to any one of [1] to [5], wherein total fineness of the filaments constituting the textile is 200 dtex to 600 dtex.

[7] The coated fabric for the airbag according to any one of [1] to [6], wherein a cover factor of the textile is 1,800 to 2,500.

Further, the present invention provides a method for producing a coated fabric for an airbag described below.

[8] A method for producing a coated fabric for an airbag comprising
applying a silicone resin only on one surface of a textile made of synthetic fiber filaments,
wherein the silicone resin has viscosity of 15 Pa·sec or less, a coating strength of the resin of 5 MPa or more, a coating elongation of the resin of 150% or less, and hardness of 45 or more.

[9] The method for producing the coated fabric for the airbag according to [8], wherein a method of applying the silicone resin is a knife on air method, and a knife compressing amount is 1 mm to 6 mm.

[10] The method for producing the coated fabric for the airbag according to [8] or [9], wherein a coating amount of the silicone resin is 5/m² to 35 g/m².

Advantageous Effects of Invention

Since the coated fabric for airbags of the present invention maintains strength even when the fineness is reduced, it has excellent quality and reliability, can be compactly packaged, and has an advantage that restriction of car-interior design can be decreased even in an airbag requiring particularly high internal pressure retention performance.

DESCRIPTION OF EMBODIMENTS

Hereinafter, the present invention will be described in detail.

Figure 1:
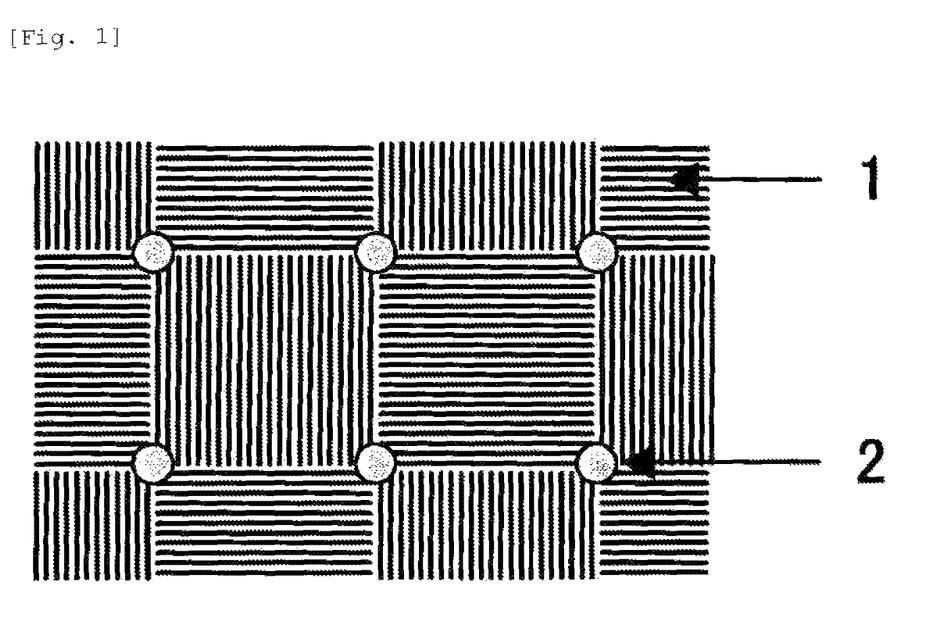
FIG. 1 is a view showing joints between the warp and weft of a non-coated surface.

According to the present invention, in a coated fabric for an airbag formed by applying a silicone resin to one surface of a textile made of synthetic fiber filaments, the silicone resin exists in the joint between the warp and weft of the non-coated surface. "A silicone resin exists" refers to a state in which a silicone resin can be visually found in an intersection portion, that is, the joint portion of the warp and weft of the non-coated surface as shown in FIG. 1. Specifically, the state can be determined from a surface photograph of the non-coated surface taken using a scanning electron microscope (SEM). Since the resin exists up to the non-coated surface side in the joint between the warp and weft, the tensile strength of a base fabric after coating was able to be increased by 5% or more compared with that of a base fabric before coating. In accordance with the present invention, the tensile strength can be improved without using high strength fibers in the base fabric for airbags formed from synthetic fiber filaments having even relatively low fineness to contribute to improvement of quality, reduction of weight and downsizing.

In the present invention, the textile made of synthetic fiber filaments means a textile that is woven using synthetic fiber filament yarns. The textile is excellent in mechanical strength and has an advantage in that the thickness can be reduced. Examples of the structure of the textile include plain weave, twill weave, sateen weave and variant weave thereof, multiaxial weave, and the like, and among them, plain weave, which is more excellent in mechanical strength, is particularly preferred.

As materials used for the synthetic fiber, aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate are particularly used. Besides the above, all-aromatic polyester fiber, poly-p-phenylenebenzobisoxazole fiber (PBO fiber), ultrahigh molecular polyethylene fiber, polyphenylene sulfide fiber, polyether ketone fiber, or the like can be used. However, when the economic efficiency is taken into consideration, polyester fiber and polyamide fiber are preferred, and polyamide 6,6 is particularly preferred. In those fibers, a part of or all of them may be produced from recycled raw materials.

In these synthetic fibers, various kinds of additives may be contained for a purpose of improving the step passing property in the manufacturing step for starting yarn or the after-processing step. Examples of the additives include an antioxidant, thermostabilizer, smoothening agent, antistatic agent, thickener, and flame retardant. Further, the synthetic fiber may be a dope-dyed yarn or a yarn that is dyed after filature. Furthermore, the cross section of a single yarn may be any deformed cross section in addition to an ordinary round cross section. It is preferred from the viewpoint of flexibility and smoothness of a coated surface to use multifilament yarn of 72 filaments or more for the synthetic fiber.

As a coating resin, elastomer resins having heat resistance, cold resistance and flame retardance are preferred; however, the most effective resins are silicone-based resins. Specific examples of the silicone-based resins include addition-polymerization silicone rubbers or the like. Examples of the addition-polymerization silicone rubbers include dimethyl silicone rubber, methylvinyl silicone rubber, methylphenyl silicone rubber, trimethyl silicone rubber, fluorosilicone rubber, methyl silicone resin, methylphenyl silicone resin, methylvinyl silicone resin, epoxy-modified silicone resin, acrylic modified silicone resin, polyester-modified silicone resin and the like. Among these, a methylvinyl silicone rubber which has rubber elasticity after curing, has excellent strength and stretching, and is advantageous in terms of cost, is suitable.

In the present invention, a resin viscosity of a silicone resin to be used is very important. The viscosity of the silicone resin is preferably 15 Pa·sec or less, and more preferably 12 Pa·sec or less. When the resin viscosity is more than 15 Pa·sec, a resin is not allowed to exist in the joint between the warp and weft of the non-coated surface, which is necessary for improving tensile strength of the base fabric after coating. The present inventor has found a novel technical thought that when a resin exists at a joint between the warp and weft, where a degree of freedom of yarn's movement is generated, up to the non-coated surface side, the yarn is restrained and the whole yarn is broken at a time at an ordinary tensile test of a base fabric, and therefore it is possible to achieve high tensile strength as a base fabric. A lower limit is not particularly limited; however, it is preferably 5 Pa·sec or more. The silicone resin may be solvent-based or may be solvent-free as long as its viscosity can be adjusted to within the above-mentioned viscosity range; however, a solvent-free silicone resin is suitable in consideration of an impact on an environment.

In addition, in the present invention, when a resin composition containing an additive other than a resin is used, the viscosity of this resin composition is also defined as "viscosity of a resin".

Further, it is preferred that coating strength of the resin is 5 MPa or more, and coating elongation is 150% or less. In general, the coating strength and the coating elongation are physical properties linked with each other, and particularly if the coating elongation is set to 150% or less, a degree of freedom of yarn generated due to elongation of a resin is suppressed when a resin exists at the joint between the warp and weft of the non-coated surface to restrain the yarn and the whole yarn is broken at a time, and therefore it is possible to achieve high tensile strength as a base fabric. A more preferred range of the coating elongation is 120% or less. An upper limit of the coating strength is not particularly limited; however, it is preferably 10 MPa or less. The coating elongation is preferably 50% or more from the viewpoint of flexibility of the coated fabric.

In addition, a sample for measurement of the coating strength and coating elongation of a silicone resin is prepared in conformity with the conditions (temperature, time, pressure) at the time of actually coating a textile for an airbag to form a coating. Specifically, a resin coating having a constant thickness of 0.5 mm of a silicone resin is prepared, and cured at 190° C. for 2 minutes by a hot air blowing method, and a tensile test is performed.

Further, the hardness of the resin is measured according to ASTM D2240, and the hardness, measured by using a hardness meter of Shore A, is preferably 45 or more. The hardness is more preferably 47 or more. When the hardness is 45 or more, as with the elongation of a resin, yarn's movement due to deformation of a resin at a tensile test is suppressed to restrain the yarn and the whole yarn is broken at a time, and therefore it is possible to achieve high tensile strength as a base fabric. An upper limit of the hardness is not particularly limited, and it is commonly 70 or less.

Since alkenyl group-containing polysiloxane which is a component serving as a base compound constituting a coated layer of the coated fabric of the present invention becomes a silicone resin coating having rubber elasticity after a resin is cured, it contains two or more alkenyl groups coupled to a silicon atom per molecule. Examples of a position of the silicon atom, to which the alkenyl group is coupled, in an alkenyl group-containing polysiloxane skeleton, include a molecular chain terminal and/or any position in a molecular chain (i.e., non-terminal position of the molecular chain); however, linear alkenyl group-containing polysiloxane containing alkenyl groups coupled to silicon atoms on both thereof, is preferred.

The viscosity at 25° C. of an alkenyl group-containing polysiloxane component is preferably 10,000 to 30,000 mPa·sec, and particularly preferably 13,000 to 27,000 mPa·sec from the viewpoint of physical properties such as adhesiveness of a cured product to fibers, rubber strength and blocking resistance and workability.

Organo hydrogen polysiloxane constituting a silicone resin reacts with alkenyl group-containing polysiloxane by a hydrosilylation addition reaction and acts as a crosslinking agent. A molecular structure of organo hydrogen polysiloxane may be any of a linear, cyclic, branched and three-dimensional network structures.

Organo hydrogen polysiloxane has at least two or more (commonly 2 to about 300) hydrogen atoms coupled to silicon atoms per molecule. When organo hydrogen polysiloxane has a linear structure, these hydrogen atoms coupled to silicon atoms may be positioned at only one of the molecular chain terminal and the molecular chain midpoint (i.e., molecular chain non-terminal), or may be positioned at both thereof.

Further, the viscosity at 25° C. of organo hydrogen polysiloxane (B) is preferably 0.1 to 1,000 mPa·sec, and particularly preferably 0.1 to 500 mPa·sec.

An amount of organo hydrogen polysiloxane (B) to be mixed is an amount in which the number of hydrogen atoms coupled to a silicon atoms) in the (B) component is generally 1 to 20, more preferably 1 to 10, and particularly preferably 1 to 5 with respect to one alkenyl group coupled to a silicon atom in the (A) component.

The coating strength and coating elongation of a resin can be adjusted by a molecular weight of the alkenyl group-containing polysiloxane and a structure and mixed amount of the organo hydrogen polysiloxane.

When the silicone resin is used, a reaction curing agent may be used, and a typical example thereof is platinum or a platinum compound catalyst (platinum-based catalyst). As the platinum compound catalyst, publicly known compounds can be used, and specific examples thereof include platinum black, chloroplatinic acid, alcohol-modified chloroplatinic acid, and complexes of chloroplatinic acid and olefin, aldehyde, vinylsiloxane or acetylene alcohol etc. While the more the platinum compound catalyst is mixed, the more a hydrosilylation reaction is promoted, the platinum compound catalyst is commonly added in an amount of 100 to 2000 ppm in terms of platinum metal amount with respect to a composition.

In order to improve the adhesiveness between the silicone resin and the base fabric, an adhesion aid is preferably contained in the silicone resin. Examples of the adhesion aid include at least one selected from the group consisting of an amino-based silane coupling agent, an epoxy-modified silane coupling agent, a vinyl-based silane coupling agent, a chloro-based silane coupling agent and a mercapto-based silane coupling agent, but not limited to these.

Further, as required, reinforcing inorganic fillers such as fumed silica and dry silica, crosslinkable silicones (silicone resins) whose terminal group is modified or non-reinforcing inorganic fillers such as calcium carbonate, calcium silicate and titanium dioxide can be added. A usage of these inorganic fillers is 0.1 to 200 parts by mass, and particularly preferably 0.1 to 100 parts by mass of alkenyl group-containing polysiloxane component.

Moreover, as a coloring agent, an inorganic pigment or an organic pigment may be added, and examples of the inorganic pigment include carbon black, titanium oxide, red iron oxide, black iron oxide, titanium yellow and cobalt blue, and examples of the organic pigment include condensed azo type (yellow, brown, red), isoindolinon type (yellow, orange), quinacridone type (red, violet), diketo-pyrrolo-pyrrole type (orange, red, violet), anthraquinone type (yellow, red, blue), dioxazine type (violet), benzimidazolone type (orange), copper phthalocyanine type (blue), and arylamide type (yellow).

A coating amount of resin of the coated fabric for airbags of the present invention is preferably 5 to 45 $g/m^2$, and more preferably 10 to 35 $g/m^2$. When the coating amount of resin is not more than 5 $g/m^2$, since a thickness of a resin layer applied to the surface of a textile is low, a required resin thickness on the surface of the coated fabric is not achieved to disable to achieve suppression of air permeation. On the other hand, when the coating amount is not less than 45 $g/m^2$, this not only impairs the packageability of an airbag because flexibility of a coated textile is deteriorated, but also a weight of the whole airbag becomes large.

In the coated fabric for airbags of the present invention, an average resin thickness of warp and weft at a head top in the coated fabric surface is preferably not less than 4 μm, and more preferably not less than 6 μm. In addition, the head top refers to a part where the coating thickness of a resin on the warp or the weft is the smallest. In the present invention, it is preferred that a resin is not so permeated into a textile, and the resin is present throughout the textile of the coated surface and also present in a relatively uniform thickness particularly at the head top of the textile. When the resin thickness is less than 4 μm, there is a possibility that suppression of air permeation and flame retardance are not satisfied. An upper limit of the thickness is not particularly limited; however, when the thickness is 25 μm or more, application by knife coating becomes difficult.

In the present invention, in order to allow a resin to exist in the joint between the warp and weft of the non-coated surface, a method of applying a resin is very important. As the method of applying a resin, a publicly known method is used, and knife coating, particularly, coating by a knife on air method is the most preferred from the viewpoint of ease of adjustment of a coating amount and an impact when an extraneous material (protruding object) mixes. In a knife on bed method, although a resin is easily permeated into a textile, it becomes hard for a resin to exist at a textile head top of the coated surface, and it becomes impossible to achieve suppression of air permeation inherently required of the coated fabric. In the present invention, as a blade tip shape of a knife to be used in knife coating, a semicircle shape, an angular shape or the like can be used.

In knife coating by the knife on air method, a tensile force of a base fabric in a traveling direction is preferably 300 to 800 N/m, and particularly preferably 400 to 750 N/m. When the tensile force of the base fabric in a traveling direction is less than 400 N/m, selvages of a base textile are bulky and a large difference in the coating amount tends to be produced between a central portion and selvage portions of the base fabric. On the other hand, when the tensile force of the base fabric in a traveling direction is more than 800 N/m, voids present in warps and wefts are obstructed, and therefore resin cannot exist in the joint between the warp and weft of the non-coated surface.

Figure 2:
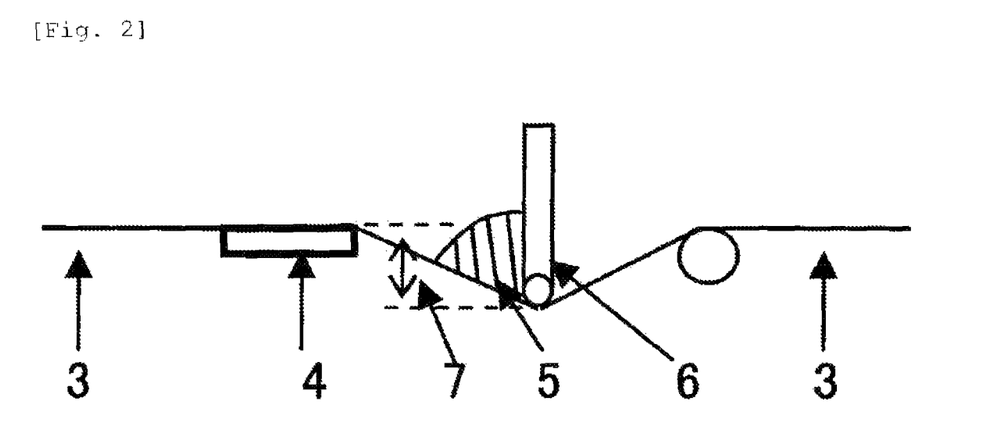
FIG. 2 is a view showing a step of coating by a knife on air method of the present invention.

In the present invention, it is important that a knife compressing amount is 1 to 6 mm. In the knife on air method, when a height of a top surface of abed at which a knife is positioned immediately before knife compressing is taken as 0 mm, the knife compressing amount corresponds a distance through which the knife is compressed downward from the height (FIG. 2). The knife compressing amount is more preferably 1.5 mm to 4.5 mm. When the knife compressing amount is less than 1 mm, it is difficult to allow a resin to exist in the joint between the warp and weft of the non-coated surface which is an object of the present invention. When the knife compressing amount is not less than 6 mm, although the resin is easily permeated into the textile, it becomes hard to allow the resin to exist at the vertex portion in the textile of the coated surface, and it becomes difficult to achieve suppression of air permeation inherently required of the coated fabric.

As a method of drying and curing the applied coating agent, heating methods commonly used such as heating by hot air, infrared light, microwave and the like, can be used. A heating temperature and heating time present no problem as long as a silicone resin reaches a temperature adequate for curing, and the heating temperature and the heating time are preferably 150 to 220° C. and 0.2 to 5 minutes, respectively.

The total fineness of a filament yarn constituting the textile is preferably 200 to 600 dtex. When the total fineness is more than 600 dtex, the thickness of the base fabric increases, and the packageability of airbag tends to deteriorate. On the other hand, when the total fineness is less than 200 dtex, mechanical characteristics on the operation of airbag such as tear mechanical properties of the coated fabric tends to deteriorate.

A cover factor of the textile that constitutes abase fabric is preferably 1,800 to 2,500, and particularly preferably 1,900 to 2,450. When the cover factor is less than 1,800, physical characteristics required as an airbag (tear strength or the like) decrease. On the other hand, when the cover factor is more than 2,500, there are limits during weaving and in the packageability. Further, when the cover factor of the textile is high, since voids present in warps and wefts are decreased, the resin hardly exists in the joint between the warp and weft of the non-coated surface.

In addition, the cover factor (CF) is calculated by the following formula.

$$CF = \sqrt{(\text{total fineness of warp})} \times \text{warp density} + \sqrt{(\text{total fineness of weft})} \times \text{weft density}$$

In addition, a unit of the total fineness is "dtex", and a unit of the weaving density is "number of yarns/2.54 cm".

EXAMPLES

The present invention is described concretely below with reference to Examples, but the present invention is not limited thereto. The measured values disclosed in the Examples are values measured by the following methods.

(1) Total Fineness

Total fineness was measured according to the method mentioned in JIS L-1095 9.4.1.

(2) Filament Numbers

Filament numbers were counted from the cross-sectional picture of a filament yarn.

(3) Density of Textile

The density of the textile was measured according to the method mentioned in JIS L-1096 8.6.1.

(4) Tensile Strength

The tensile strength was measured according to the method mentioned in JIS K 6404-3.

(5) Viscosity of Resin

The viscosity was measured by a B-type viscometer using the method mentioned in JIS K 7117.

(6) Strength and Elongation of Resin Coating

A resin coating having a uniform thickness of 0.5 mm was prepared, and cured at 190° C. for 2 minutes by a hot air blowing method. A tensile test of the prepared resin coating was conducted at a chuck distance of 10 mm and at a speed of 10 mm/min to measure the strength and elongation at break of the coating using a constant-speed loading type tensile tester.

(7) Hardness

The hardness of the resin was measured using a hardness meter of Shore A according to the method mentioned in ASTM D2240.

(8) Coating Amount

A coated fabric after curing a resin was collected in a size of exact 5 cm square and immersed in a solvent (hexafluoroisopropanol in the case of polyamide 66) in which only fibers as a base fabric are dissolved to dissolve the base fabric. Then, only the silicone coated layer which was an insoluble matter was recovered, washed with acetone, and vacuum dried, and then weighing of a sample was carried out. In addition, the coating amount is expressed by a mass per 1 m² (g/m²).

(9) Impregnation of Non-Coated Surface with Resin

A surface photograph of the non-coated surface of the coated fabric was taken in five points randomly selected, and the case where a resin was identified at all of four corners of an intersection portion of the warp and the weft was rated as a symbol ○, and the case where a resin was not identified at any or all of four corners was rated as a symbol x.

(10) Ratio Between Tensile Strength Before Coating and Tensile Strength after Coating A value calculated by dividing a sum of the measurement value of tensile strength of a base fabric after coating in a warp direction and the measurement value of tensile strength of a base fabric after coating in a weft direction by a sum of the measurement value of tensile strength of a base fabric before coating in a warp direction and the measurement value of tensile strength of a base fabric before coating in a weft direction, was described. The described value was rounded to two decimal places.

Example 1

Polyamide 66 multi-filament yarn including 144 filaments in which the strength of raw yarn was 8.2 cN/dtex and the total fineness was 470 dtex was woven by plain weave in a water jet loom. Then, the resulting product was subjected to shrinkage processing using boiling water and dry finishing at 110° C. to obtain a textile in which a warp density was 46 yarns/2.54 cm, a weft density was 46 yarns/2.54 cm, and the cover factor was 1,994. The tensile strength of the base fabric was 635 N/cm in a warp direction, and 658 N/cm in a weft direction.

Next, a solvent-free type silicone resin composition composed of the following compositions and having viscosity at 25° C. of 9 Pa·sec was formulated. The coating strength, the coating elongation and hardness of the silicone resin at this time were 6.0 MPa, 97% and 55, respectively.
(Compounding of Solvent-Free Type Silicone Resin Composition)
(A) Vinyl group-containing dimethylpolysiloxane (weight average molecular weight: 31000): 78 parts by mass
(B) Methyl hydrogen polysiloxane (weight average molecular weight: 2800, number of hydrogen atoms coupled to silicon atoms: 10): 5 parts by mass
(C) Dry silica particle: 0.5% by mass (with respect to a silicone resin composition)
(produced by NIPPON AEROSIL CO., LTD., AEROSIL (registered trademark) NX90; average primary particle size: 20 nm, specific surface area: 90 m$^2$/g, product treated with trimethylsilane)
(D) Organic silicon compound having an epoxy group: 1.1 parts by mass
(having three methoxy groups and an epoxy group, weight average molecular weight: 240)
(E) Organic silicon compound having a vinyl group coupled to a silicon atom: 0.4 parts by mass
(having three methoxy groups and an vinyl group, weight average molecular weight: 150)
(F) Crosslinkable silicone: terminal trimethylsilane/vinyldimethylsilane in a molar ratio of 86:14:14.5 parts by mass
(G) Platinum catalyst: 20 ppm (with respect to a silicone resin composition)
(H) Colcothar pigment: 0.5 parts by mass This silicone resin composition was applied to one surface of the above-mentioned textile with use of a knife having a tip portion radius R of 0.3 mm by a knife on air method with a base fabric tension and a knife compressing amount adjusted to 500 N/m and 1 mm, respectively. Moreover, the resin composition was cured at 190° C. for 2 minutes to obtain a coated fabric in which a coating amount was 20 g/m$^2$. Characteristics of the obtained coated fabric were evaluated and the results thereof are shown in Table 1. The obtained base fabric was impregnated with the resin up to the non-coated surface, and tensile strength was improved by 9% after coating.

Example 2

Polyamide 66 multi-filament yarn including 72 filaments in which the strength of raw yarn was 8.0 cN/dtex and the total fineness was 470 dtex was woven by plain weave in a water jet loom. Then, the resulting product was subjected to shrinkage processing using boiling water and dry finishing at 110° C. to obtain a textile in which a warp density was 46 yarns/2.54 cm, a weft density was 46 yarns/2.54 cm, and the cover factor was 1,994. The tensile strength of the base fabric was 638 N/cm in a warp direction, and 619 N/cm in a weft direction.

A solvent-free type silicone resin composition having the same composition as in Example 1 except that 78 parts by mass of (A1) vinyl group-containing dimethylpolysiloxane (weight average molecular weight: 33000) was added in place of 78 parts by mass of (A) vinyl group-containing dimethyl polysiloxane (weight average molecular weight: 31000) and having viscosity at 25° C. of 8 Pa·sec, was formulated. The coating strength, the coating elongation and hardness of the silicone resin at this time were 5.5 MPa, 111% and 51, respectively.

This silicone resin composition was applied to one surface of the above-mentioned textile with use of a knife having a tip portion radius R of 1.2 mm by a knife on air method with a base fabric tension and a knife compressing amount adjusted to 550 N/m and 2 mm, respectively. Moreover, the resin composition was cured at 190° C. for 2 minutes to obtain a coated fabric in which a coating amount was 35 g/m$^2$. Characteristics of the obtained coated fabric were evaluated and the results thereof are shown in Table 1. The obtained base fabric was impregnated with the resin up to the non-coated surface, and tensile strength was improved by 11% after coating.

Example 3

Using the same raw yarn as in Example 1 and conducting the same steps as in Example 1, a textile in which a warp density was 51 yarns/2.54 cm, a weft density was 51 yarns/2.54 cm, and the cover factor was 2,211, was obtained. The tensile strength of the base fabric was 699 N/cm in a warp direction, and 716 N/cm in a weft direction.

A solvent-free type silicone resin composition having the same composition as in Example 1 except that 78 parts by mass of (A2) vinyl group-containing dimethylpolysiloxane (weight average molecular weight: 35000) was added in place of 78 parts by mass of (A) vinyl group-containing dimethyl polysiloxane (weight average molecular weight: 31000) and having viscosity at 25° C. of 8 Pa·sec, was formulated. The coating strength, the coating elongation and hardness of the silicone resin at this time were 5.2 MPa, 120% and 47, respectively.

This silicone resin composition was applied to one surface of the above-mentioned textile with use of a knife having a tip portion radius R of 0.3 mm by a knife on air method with a base fabric tension and a knife compressing amount adjusted to 650 N/m and 2 mm, respectively. Moreover, the resin composition was cured at 190° C. for 2 minutes to obtain a coated fabric in which a coating amount was 15 g/m$^2$. Characteristics of the obtained coated fabric were evaluated and the results thereof are shown in Table 1. The obtained base fabric was impregnated with the resin up to the non-coated surface, and tensile strength was improved by 5% after coating.

Example 4

Polyamide 66 multi-filament yarn including 72 filaments in which the strength of raw yarn was 8.5 cN/dtex and the total fineness was 235 dtex was woven by plain weave in a water jet loom. Then, the resulting product was subjected to shrinkage processing using boiling water and dry finishing at 110° C. to obtain a textile in which a warp density was 73 yarns/2.54 cm, a weft density was 73 yarns/2.54 cm, and the cover factor was 2,238. The tensile strength of the base fabric was 492 N/cm in a warp direction, and 493 N/cm in a weft direction.

Next, the resin having the same composition as in Example 1 was applied to one surface of the above-mentioned textile with use of a knife having a tip portion radius R of 0.6 mm with a base fabric tension and a knife compressing amount to 450 N/m and 5 mm, respectively. Moreover, the resin composition was cured at 190° C. for 2 minutes to obtain a coated fabric in which a coating amount was 25 g/m$^2$. Characteristics of the obtained coated fabric were evaluated and the results thereof are shown in Table 1. The obtained base fabric was impregnated with the resin up to the non-coated surface, and tensile strength was improved by 5% after coating.

Example 5

Polyamide 66 multi-filament yarn including 108 filaments in which the strength of raw yarn was 8.3 cN/dtex and the total fineness was 350 dtex was woven by plain weave in a water jet loom. Then, the resulting product was subjected to shrinkage processing using boiling water and dry finishing at 110° C. to obtain a textile in which a warp density was 55 yarns/2.54 cm, a weft density was 55 yarns/2.54 cm, and the cover factor was 2,058. The tensile strength of the base fabric was 570 N/cm in a warp direction, and 560 N/cm in a weft direction.

Then, the resin having the same composition as in Example 3 was applied to one surface of the above-mentioned textile with use of a knife having a tip portion radius R of 0.2 mm with a base fabric tension and a knife compressing amount adjusted to 450 N/m and 3 mm, respectively. Moreover, the resin composition was cured at 190° C. for 2 minutes to obtain a coated fabric in which a coating amount was 35 g/m². Characteristics of the obtained coated fabric were evaluated and the results thereof are shown in Table 1. The obtained base fabric was impregnated with the resin up to the non-coated surface, and tensile strength was improved by 7% after coating.

Example 6

Polyester multi-filament yarn including 192 filaments in which the strength of raw yarn was 7.2 cN/dtex and the total fineness was 570 dtex was woven by plain weave in a water jet loom. Then, the resulting product was subjected to shrinkage processing using boiling water and dry finishing at 110° C. to obtain a textile in which a warp density was 46 yarns/2.54 cm, a weft density was 46 yarns/2.54 cm, and the cover factor was 2,196. The tensile strength of the base fabric was 626 N/cm in a warp direction, and 620 N/cm in a weft direction.

Then, the resin having the same composition as in Example 1 was applied to one surface of the above-mentioned textile with use of a knife having a tip portion radius R of 0.6 mm with a base fabric tension and a knife compressing amount adjusted to 400 N/m and 4 mm, respectively. Moreover, the resin composition was cured at 190° C. for 2 minutes to obtain a coated fabric in which a coating amount was 25 g/m². Characteristics of the obtained coated fabric were evaluated and the results thereof are shown in Table 1. The obtained base fabric was impregnated with the resin up to the non-coated surface, and tensile strength was improved by 5% after coating.

Comparative Example 1

Using the textile of Example 2, a solvent-free type silicone resin composition having the same composition as in Example 1 except that 19 parts by mass of (A3) vinyl group-containing dimethylpolysiloxane (weight average molecular weight: 45000) and 59 parts by mass of (A4) vinyl group-containing dimethylpolysiloxane (weight average molecular weight: 23000) were added in place of 78 parts by mass of (A) vinyl group-containing dimethyl polysiloxane (weight average molecular weight: 31000), further the additive amount of (C) dry silica particle was changed to 14.6% by mass, and (F) component was not added and having viscosity at 25° C. of 22 Pa·sec, was formulated. The coating strength, the coating elongation and hardness of the silicone resin at this time were 3.8 MPa, 367% and 42, respectively.

This silicone resin composition was applied to one surface of the above-mentioned textile with use of a knife having a tip portion radius R of 0.5 mm by a knife on air method with a base fabric tension and a knife compressing amount adjusted to 500 N/m and 3 mm, respectively. Moreover, the resin composition was cured at 190° C. for 2 minutes to obtain a coated fabric in which a coating amount was 25 g/m². Characteristics of the obtained coated fabric were evaluated and the results thereof are shown in Table 1. The obtained base fabric was not impregnated with the resin up to the non-coated surface, and tensile strength was not improved.

Comparative Example 2

Using the textile of Example 3, a solvent-free type silicone resin composition having the same composition as in Example 1 except that 9 parts by mass of (A3) vinyl group-containing dimethylpolysiloxane (weight average molecular weight: 45000) and 69 parts by mass of (A4) vinyl group-containing dimethylpolysiloxane (weight average molecular weight: 23000) were added in place of 73 parts by mass of (A) vinyl group-containing dimethyl polysiloxane (weight average molecular weight: 31000), further the additive amount of (C) dry silica particle was changed to 5.2% by mass and having viscosity at 25° C. of 15 Pa·sec, was formulated. The coating strength, the coating elongation and hardness of the silicone resin at this time were 2.7 MPa, 415% and 31, respectively.

This silicone resin composition was applied to one surface of the above-mentioned textile with use of a knife having a tip portion radius R of 0.3 mm by a knife on air method with a base fabric tension and a knife compressing amount adjusted to 650 N/m and 7 mm, respectively. Moreover, the resin composition was cured at 190° C. for 2 minutes to obtain a coated fabric in which a coating amount was 15 g/m². Characteristics of the obtained coated fabric were evaluated and the results thereof are shown in Table 1. Although, the obtained base fabric was impregnated with the resin up to the non-coated surface, tensile strength was not improved.

Comparative Example 3

Using the same textile and resin as in Example 4, the silicone resin composition was applied to one surface of the textile with use of a knife having a tip portion radius R of 0.6 mm with a base fabric tension and a knife compressing amount adjusted to 450 N/m and 0.5 mm, respectively. Moreover, the resin composition was cured at 190° C. for 2 minutes to obtain a coated fabric in which a coating amount was 28 g/m². Characteristics of the obtained coated fabric were evaluated and the results thereof are shown in Table 1. The obtained base fabric was not impregnated with the resin up to the non-coated surface, and tensile strength was improved only 1%.

TABLE 1

| | | | Example | | | | | | Comparative Example | | |
|---|---|---|---|---|---|---|---|---|---|---|---|
| | | | 1 | 2 | 3 | 4 | 5 | 6 | 1 | 2 | 3 |
| Property of base fabric before coating | Total fineness | dtex | 470 | 470 | 470 | 235 | 350 | 570 | 470 | 470 | 235 |
| | Filament numbers | number | 144 | 72 | 144 | 72 | 108 | 192 | 72 | 144 | 72 |
| | Weaving density (warp/weft) | yarns/ 2.54 cm | 46/46 | 46/46 | 51/51 | 73/73 | 55/55 | 46/46 | 46/46 | 51/51 | 73/73 |
| | Cover factor | — | 1,994 | 1,994 | 2,211 | 2,238 | 2,058 | 2,196 | 1,994 | 2,211 | 2,238 |
| | Tensile strength (warp/weft) | N/cm | 635/658 | 638/619 | 699/716 | 492/493 | 570/560 | 626/620 | 638/619 | 699/716 | 492/493 |
| Property of Si resin | Viscocity of resin | Pa·sec | 9 | 8 | 8 | 9 | 8 | 9 | 22 | 15 | 9 |
| | Resin film strength | MPa | 6.0 | 5.5 | 5.2 | 6.0 | 5.2 | 6.0 | 3.8 | 2.7 | 6.0 |
| | Resin film elongation | % | 97 | 111 | 120 | 97 | 120 | 97 | 367 | 415 | 97 |
| | Hardness | — | 55 | 51 | 47 | 55 | 47 | 55 | 42 | 31 | 55 |
| Coating condition | Compressing amount of knife | mm | 1 | 2 | 2 | 5 | 3 | 4 | 3 | 7 | 0.5 |
| Property of coated fabric | Coating amount | g/m² | 20 | 35 | 15 | 25 | 35 | 25 | 25 | 15 | 28 |
| | Impregnation of Non-Coated Surface with Resin | — | ○ | ○ | ○ | ○ | ○ | ○ | × | ○ | × |
| | Tensile strength (warp/weft) | N/cm | 699/666 | 704/689 | 741/740 | 610/572 | 522/529 | 680/630 | 631/629 | 717/708 | 497/498 |
| | Ratio between Tensile Strengths before and after Coating | — | 1.09 | 1.11 | 1.05 | 1.05 | 1.07 | 1.05 | 1.00 | 1.01 | 1.01 |

INDUSTRIAL APPLICABILITY

Since the coated fabric for airbags of the present invention maintains strength even when the fineness is reduced, it has excellent quality and reliability, can be compactly packaged, and has an advantage that restriction of car-interior design can be decreased even in an airbag requiring particularly high internal pressure retention performance. Thus, the coated fabric for airbags of the present invention has large contribution in industry.

EXPLANATION OF REFERENCE SIGNS

1 Non-coated side (surface) of base fabric
2 Resin
3 Base fabric
4 Bed
5 Resin
6 Knife
7 Knife compressing amount

The invention claimed is:

1. A coated fabric for an airbag comprising:
a textile made of synthetic fiber filaments, the textile having first and second surfaces; and
a silicone resin;
wherein
the first surface is coated with the silicone resin, the silicone resin having an average resin thickness of warp and weft at a head top in the first surface not less than 4 µm, and
the second surface has a non-coated area and a coated area, the coated area comprises joints between warp and weft only, and the coated area is coated with the silicone resin.

2. The coated fabric for the airbag according to claim 1, wherein a tensile strength of the base fabric after coating is 5% or more higher than that of a base fabric before coating.

3. The coated fabric for the airbag according to claim 1, the silicone resin has viscosity before coating of 15 Pa·sec or less, a coating strength of the resin of 5 MPa or more, a coating elongation of the resin of 150% or less and hardness of 45 or more.

4. The coated fabric according to claim 1, wherein a total coating amount of the silicone resin is 5 g/m² or more and 35 g/m² or less.

5. The coated fabric according to claim 1, wherein the coated fabric is produced by an applying method wherein the applying method of the silicone resin is a knife on air method in which a knife compressing amount is 1 mm to 6 mm.

6. The coated fabric for the airbag according to claim 1, wherein total fineness of the filaments constituting the textile is 200 dtex to 600 dtex.

7. The coated fabric for the airbag according to claim 1, wherein a cover factor of the textile is 1,800 to 2,500.

8. A method for producing a coated fabric for an airbag according to claim 1, comprising
applying a silicone resin only on one surface of a textile made of synthetic fiber filaments,
wherein the silicone resin has viscosity of 15 Pa·sec or less, a coating strength of the resin of 5 MPa or more, a coating elongation of the resin of 150% or less, and hardness of 45 or more.

9. The method for producing the coated fabric for the airbag according to claim 8, wherein a method of applying the silicone resin is a knife on air method, and a knife compressing amount is 1 mm to 6 mm.

10. The method for producing the coated fabric for the airbag according to claim 8, wherein a coating amount of the silicone resin is 5 g/m² to 35 g/m².

* * * * *